United States Patent [19]
Speiser et al.

[11] 3,800,248
[45] Mar. 26, 1974

[54] UNIDIRECTIONAL SURFACE WAVE TRANSDUCER DEVICE

[75] Inventors: Jeffrey M. Speiser; Harper John Whitehouse, both of San Diego, Calif.

[73] Assignee: The United States of America as represented by the Secretary of the Navy, Washington, D.C.

[22] Filed: Oct. 31, 1972

[21] Appl. No.: 302,440

[52] U.S. Cl.............. 333/30 R, 310/8.1, 310/9.8, 333/70 T, 333/72
[51] Int. Cl......... H03h 9/02, H03h 9/30, H03h 9/26
[58] Field of Search................. 333/72, 70 T, 30 R; 310/8.0, 8.1, 8.2, 8.3, 9.7, 9.8

[56] References Cited
UNITED STATES PATENTS

| | | | |
|---|---|---|---|
| 3,675,163 | 7/1972 | Hartmann et al.............. | 333/30 R |
| 3,401,360 | 9/1968 | Schulz-Dubois.............. | 333/30 R |
| 3,582,837 | 6/1971 | De Vries....................... | 333/30 X |
| 3,675,052 | 7/1972 | Lindsay et al. ................ | 310/8.1 |
| 3,686,518 | 8/1972 | Hartmann et al.............. | 333/72 X |

OTHER PUBLICATIONS
Collins et al., "Applying Surface Wave Acoustics" in Electronics, Nov. 10, 1969; pp. 97–103.

Primary Examiner—Archie R. Borchelt
Assistant Examiner—Marvin Nussbaum
Attorney, Agent, or Firm—Richard S. Sciascia; Ervin F. Johnston; John Stan

[57] ABSTRACT

A set of interdigitated surface wave transducers comprising a launch transducer which transmits an acoustic wave in one direction only, rather than the usual two opposite directions, and a receiving transducer which receives an acoustic signal from one direction only, the direction from the launch transducer. An auxiliary delay line may also be used. The set of transducers may be configured in any of three different arrangements:

(1) A transversal filter where odd-numbered taps are driven directly and even-numbered taps are driven by the auxiliary delay line, for example, with a delay corresponding to the transit time across a unit spacing between adjacent interdigitations.

(2) A delay line comprising two pairs of transducers, using two propagation paths, one path for each pair, each pair including a launch and receive transducer, one pair of transducers being configured to correspond to one member of a Golay complementary pair, the other pair of transducers being configured to correspond to the other member of a Golay complementary pair.

(3) A two-path transversal filter which combines the main features of implementations (1) and (2).

15 Claims, 11 Drawing Figures

IMPLEMENTATION FOR A CODED LAUNCH TRANSDUCER DEVICE WITH $h_1 = 1$, $h_2 = -2$, AND $h_3 = 3$

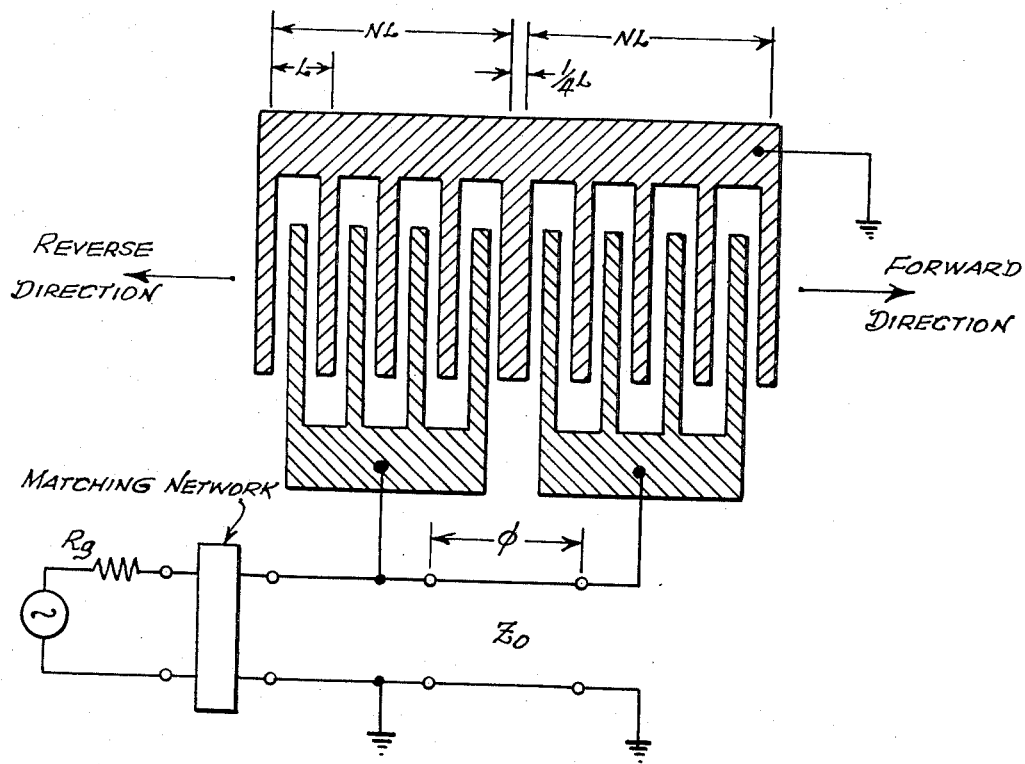
FIG. 1. (PRIOR ART) A UNIDIRECTIONAL TRANSDUCER CONFIGURATION
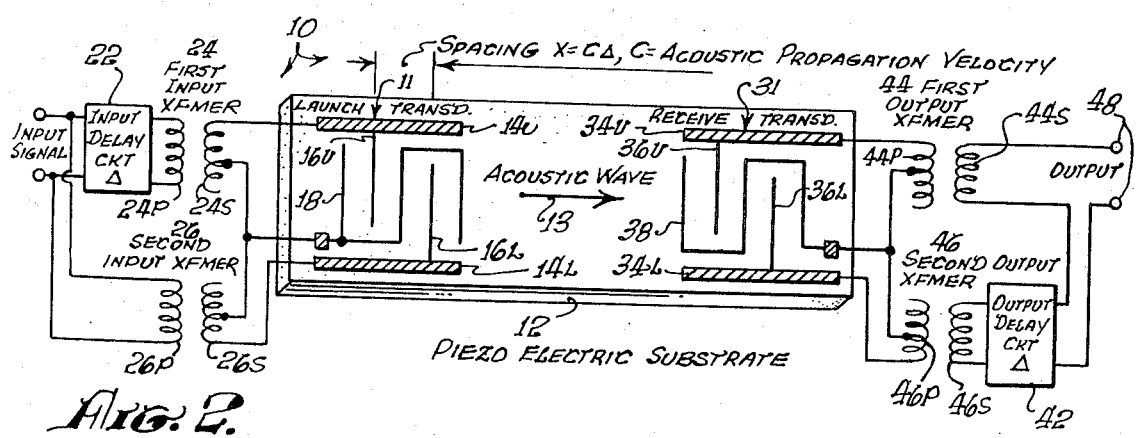
FIG. 2. SURFACE WAVE IMPLEMENTATION OF AN ELEMENTARY UNIDIRECTIONAL LAUNCH AND RECEIVE TRANSDUCER DEVICE.

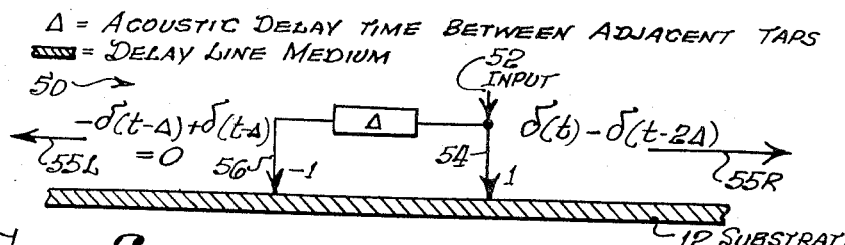
FIG. 3A. ELEMENTARY LAUNCH TRANSDUCER DEVICE.
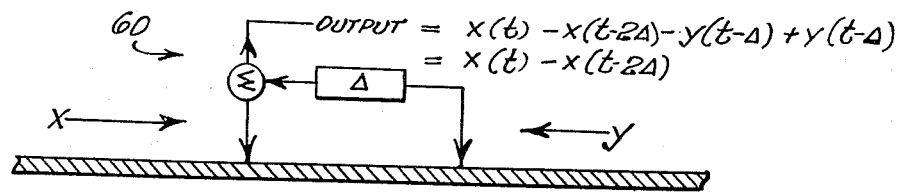
FIG. 3B. ELEMENTARY RECEIVE TRANSDUCER DEVICE.
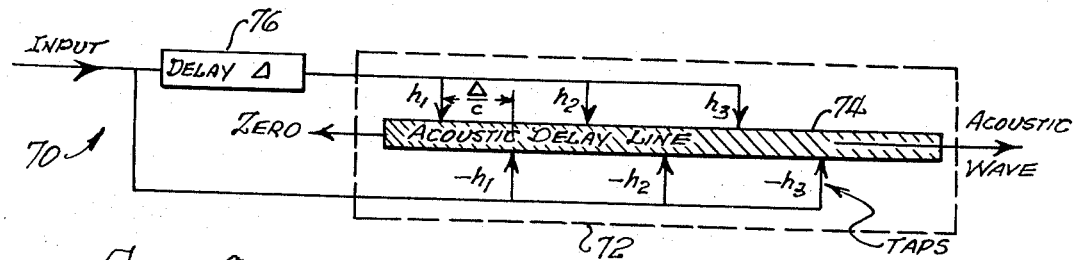
FIG. 4A. PRINCIPLE OF A CODED UNIDIRECTIONAL LAUNCH TRANSDUCER DEVICE.
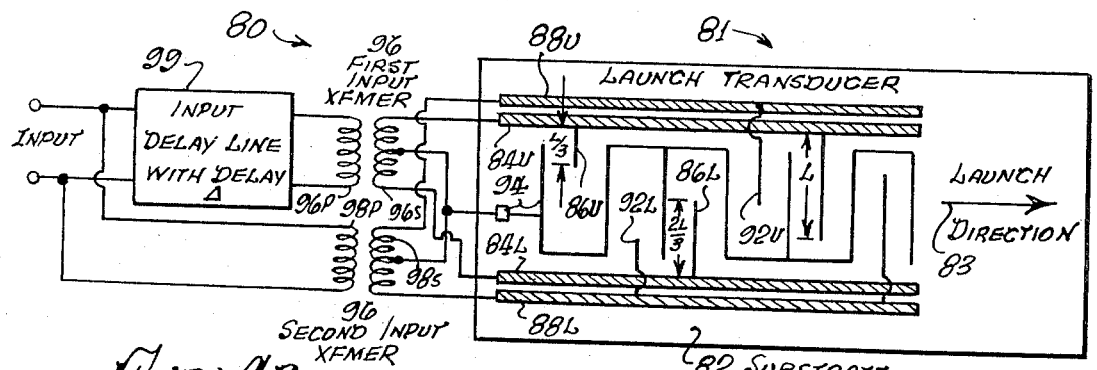
FIG. 4B. IMPLEMENTATION FOR A CODED LAUNCH TRANSDUCER DEVICE WITH $h_1 = 1$, $h_2 = -2$, AND $h_3 = 3$

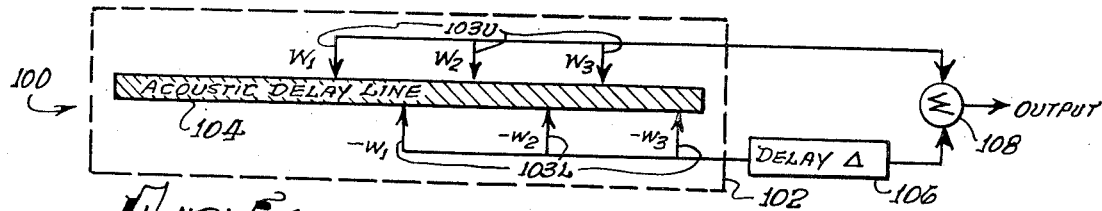
*Fig. 5A.* Principle of a coded unidirectional receive transducer device.
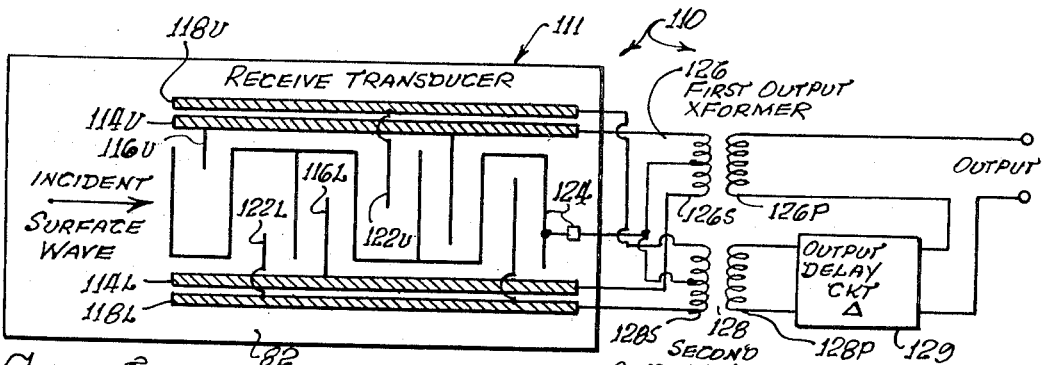
*Fig. 5B.* Implementation for a coded receive transducer with $h_1 = 1$, $h_2 = -2$, and $h_3 = 3$
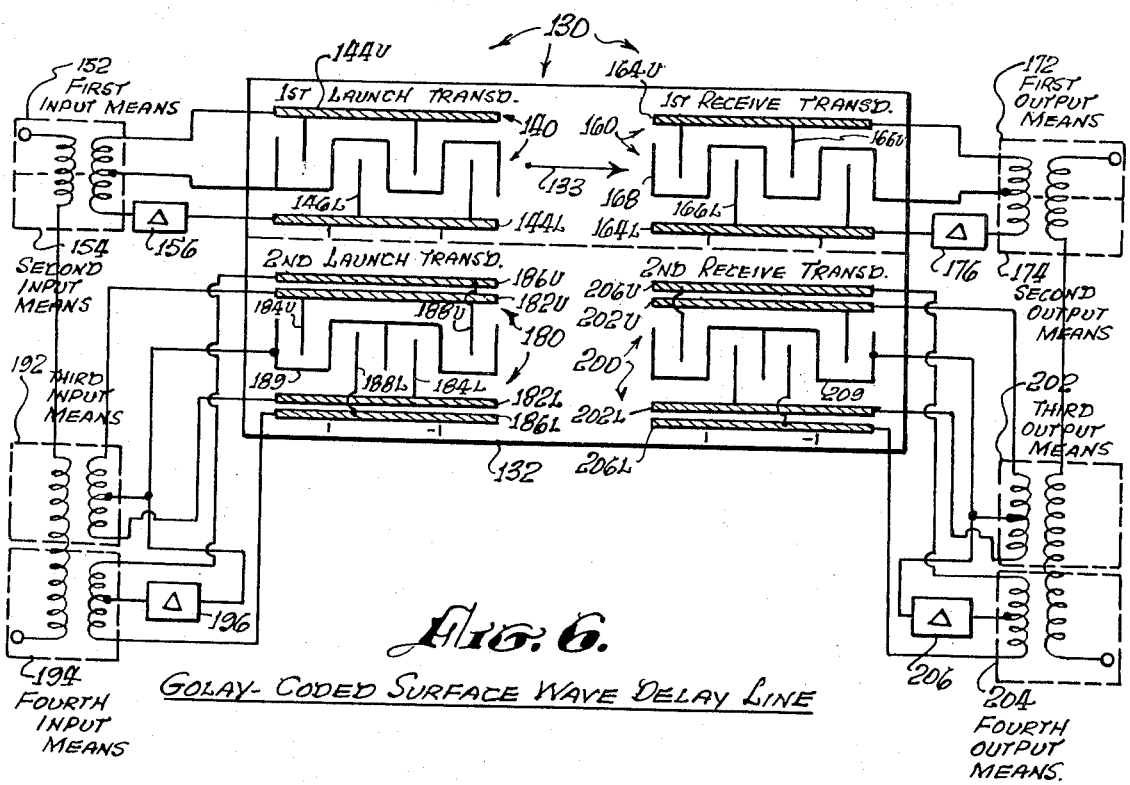
*Fig. 6.* Golay-coded surface wave delay line

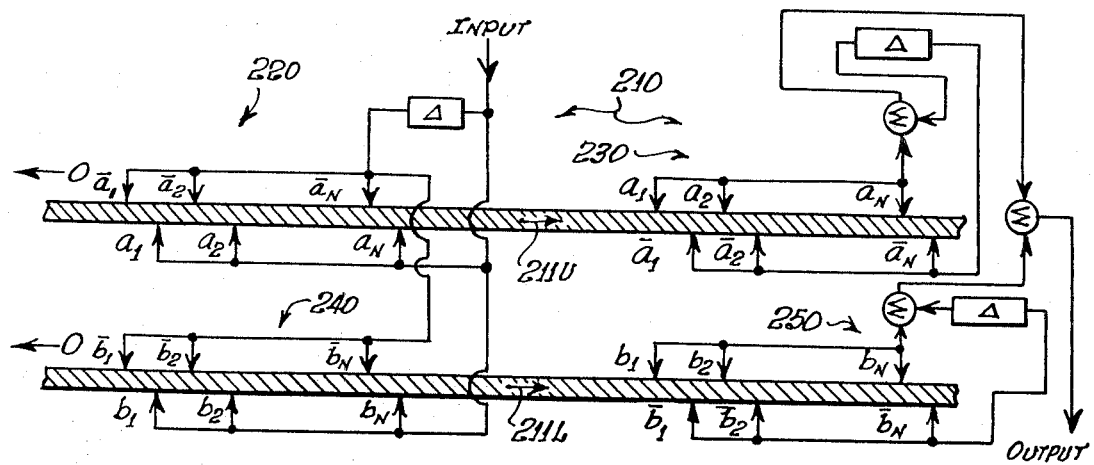
*Fig. 7.* UNIDIRECTIONAL VERSION OF GOLAY-CODED DELAY LINE
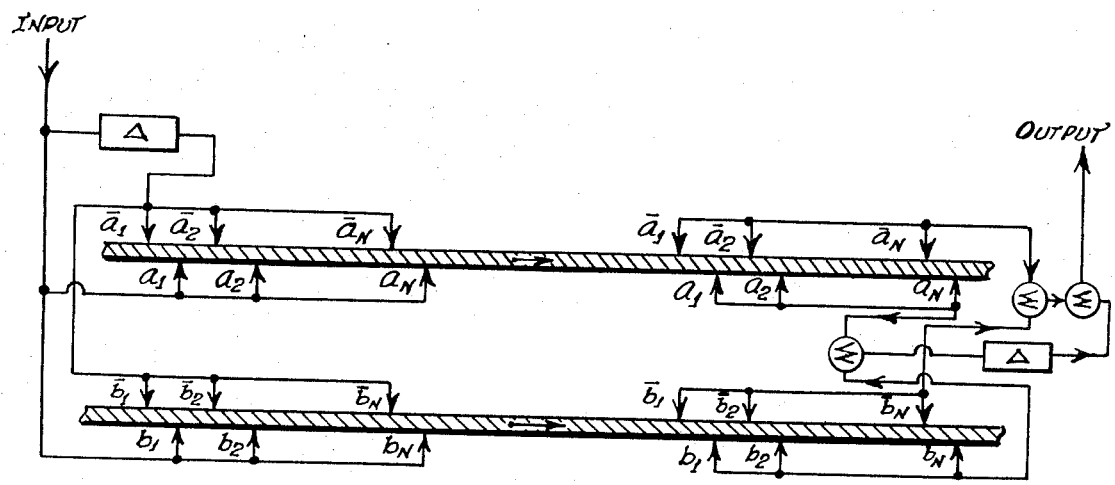
*Fig. 8.* ALTERNATIVE FORM OF GOLAY-CODED DELAY LINE

UNIDIRECTIONAL SURFACE WAVE TRANSDUCER DEVICE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to the field of unidirectional interdigital, sometimes termed "interdigitated," surface-wave transducers, that is, transducers which will launch an acoustic wave in a single direction, rather than the usual two opposite directions. Such a transducer will also receive signals from only a single direction. Such transducers act as two-port networks, having a single acoustic port and a single electrical port, unlike simpler bidirectional transducers which have two acoustic ports and one electrical port. Unidirectional transducers may be matched at both ports, allowing the elimination of triple transit echoes, which might otherwise be troublesome when transducers having low insertion loss are used.

An essential novel feature of this invention is the interleaving of two sets of coded bidirectional transducers, with each set driven from its own busline. The interleaving of the two sets rather than their arrangement in tandem permits a much higher bandwidth and allows the designer to build an essentially arbitrary filter, with time-bandwidth product limited only by the number of elementary transducers which may fit onto the substrate.

In one of two general configurations, the delay line configuration, this invention yields the low insertion loss of a periodic transducer, and a bandwidth close to that of an elementary transducer, together with suppression triple transit echoes when terminated in matched impedances, and cancellation of perturbation voltages generated in the launch transducer by the signal it launches.

In the two-path transversal filter configuration, an essential arbitrary impulse response may be obtained, limited only by the bandwidth and time-bandwidth product constraints described above. The advantages described for the delay line configuration apply here as well, except that perturbation cancellations occur only at one end of the device.

A broad feature of the invention involves multiple transducers driven by separate signals but occupying overlapping regions of space. In the prior art, as shown in FIG. 1, the transducers occupy adjacent areas of the substrate.

Although the primary application of the unidirectional transducer herein described is for transduction of elastic surface waves on a high-coupling piezoelectric substrate such as lithium niobate, the unidirectional transducer may be implemented on other types of delay lines, such as magnetostrictive delay lines, bulk wave lines, etc.

A prior art unidirectional transducer is described by J. H. Collins et al., in the IEEE Proceedings, May 1969, pp. 833-835. As shown in FIG. 1, this transducer consists of two periodic sections of bidirectional transducers, with a spacing of one quarter interdigital period between the end of the first section and the beginning of the second section. The two sections are driven in phase quadrature by interposing a quarter-wavelength transmission line electrically between them. If the electrical input is at the resonant frequency, cancellation occurs in one direction, and in-phase addition in the opposite direction.

SUMMARY OF THE INVENTION

This invention relates to unidirectional surface-wave transducers suitable for use for filters and delay lines, comprising a set of interdigitated surface wave transducers comprising a launch transducer which transmits an acoustic wave in one direction only, rather than the usual two opposite directions, and a receiving transducer which receives an acoustic signal from one direction only. The set of transducers may be configured in any of three different arrangements:

1. A transversal filter where odd-numbered taps are driven directly and even-numbered taps are driven by an auxiliary transducer, for example, with a delay corresponding to a unit spacing between adjacent interdigitations.

2. A delay line comprising two pairs of transducers, using two propagation paths, one path for each pair, each pair including a launch and receive transducer, one pair of transducers being configured to correspond to one member of a Golary complementary pair, the other pair of transducers being configured to correspond to the other member of a Golay complementary pair.

3. A two-path transversal filter which combines the main features of implementations (1) and (2).

OBJECTS OF THE INVENTION

An object of the invention is to provide a set, generally one or two pairs of interdigital surface wave transducers comprising, for each pair, a launch transducer which transmits an acoustic wave in one direction only, and a receive transducer which receives an acoustic signal from one direction only.

Another object of the invention is to provide unidirectional transducers so configured as to eliminate triple transit echos, thereby permitting the use of transducers having low insertion loss.

Yet another object of the invention is to provide a unidirectional transducer which may be used on a high-coupling piezoelectric substrate.

Yet another object of the invention is to provide a unidirectional transducer which may be implemented on other types of delay lines, such as magnetostrictive delay lines, bulk wave lines, etc.

Other objects, advantages, and novel features of the invention will become apparent from the following detailed description of the invention, when considered in conjunction with the accompanying drawings, wherein:

BRIEF DESCRIPTION OF THE DRAWINGS the 1 is a prior art diagrammatic view of a unidirectional transducer configuration.

FIG. 2 is a schematic view of a surface wave implementation of an elementary unidirectional launch and receive transducer device.

FIGS. 3A and 3B are schematic views, one, FIG. 3A, showing an elementary transmitting transducer and the other, FIG. 3B, showing an elementary receive transducer.

FIGS. 4A and 4B are schematic views. FIG. 4A showing the principle of and FIG. 4B showing the implementation for a coded launch transducer, wherein the coding is a function of the length and bus connections of the individual electrode elements.

FIGS. 5A and 5B are similar views, however, relating to a receive transducer.

FIG. 6 is a schematic view of a Golay-coded surface wave delay line implemented according to the principles of this invention.

FIG. 7 is a schematic view of a more general, unidirectional, version of a Golay-coded delay line.

FIG. 8 is a schematic view of an alternative form of a Golay-coded delay line.

DESCRIPTION OF THE PREFERRED EMBODIMENTS

Referring now to FIG. 2, therein is shown a unidirectional transducer device 10 comprising a launch transducer 11 which comprises a substrate 12 capable of propagating an acoustic surface wave, the direction of wave propagation defining an axis 13. A pair of bus bars, 14U and 14L are disposed upon the substrate 12 in a direction parallel to the axis 13 of wave propagation. The launch transducer 11 further comprises a pair of sets of active electrodes, one set 16U connected to one of the bus bars 14U, the other set 16L being connected to the other bus bar 14L, the electrodes being disposed upon the substrate in a direction perpendicular to the axis 13. In FIG. 1 the set of electrodes 16U and 16L comprises only a single electrode element, but in an actual implementation many electrode elements would be present. Generally, the pair of sets of electrodes, 14U, 14L, and 16U, 16L, are coded. A field-delineating electrode structure 18 interleaves the electrodes of the pair of sets of active electrodes, 16U and 16L, so as to electrically shield any two adjacent active electrodes from each other.

A first means, specifically described hereinbelow, is connected across one of the bus bars 14U and the field-delineating electrode structure 18, and is connectable to a signal-generating source, not shown, for impressing an electrical signal across the bus bar and the electrode structure. A second means, also more specifically described hereinbelow, is connected across the other bus bar 14L and the field-delineating electrode structure 18, and connectable to a signal generating source, also not shown, for impressing an electrical signal across the other bus bar and the electrode structure with the same polarity as the first-named electrical signal.

An input delay circuit 22 is connected to the second means, for delaying the phase of the electrical signal impressed by the second means with respect to the signal impressed by the first means. The purpose of delay circuit 22 is to delay the input signal by a small amount, equal to the transit time from one active electrode finger, to the next, for example, from the finger designated by reference numeral 16U to the finger designated by reference numeral 16L.

In the unidirectional transducer device 10, the spacing between adjacent electrodes of one of the pair of sets of electrodes 16U is the same as the spacing between corresponding adjacent electrodes of the other one, 16L, of the pair of sets of electrodes. As mentioned hereinabove, the sets 16U and 16L would ordinarily comprise many individual electrode fingers.

In the unidirectional transducer device 10, the first means for impressing an electrical signal may comprise a first input transformer 24 which includes a secondary winding 24S which is connected across one of the bus bars 14U and the field-delineating electrode structure 18; and a primary winding 24P.

The second means for impressing an electrical signal may comprise a second input transformer 26 which includes a secondary winding 26S which is connected across the other bus bar 14L and the field-delineating electrode structure 18, and a primary winding 26P connectable to the signal generating source.

The input delay circuit 22 had its input connected to the primary winding 26P of the second input transformer 26, its output being connected to the primary winding 24P of the first input transformer 24.

The unidirectional transducer device 11 may be considered a unidirectional launch transducer device, as connected.

The unidirectional launch transducer device 10, as shown in FIG. 2, may further comprise a receive transducer 31 substantially identical to the launch transducer 11, the two transducers being disposed upon the same substrate 12, with the bus bars and all of the electrodes of each of the two transducers being respectively parallel to each other.

A first output transformer 44 includes a primary winding 44P, connected across one of the bus bars 34U and the field-delineating electrode structure 38 of the receive transducer 31; and a secondary winding 44S, one end of which forms an output terminal 48.

A second output transformer 46 includes a primary winding 46P connected across the other bus bar 34L and the field-delineating electrode structure 38 of the receive transducer 31; and a secondary winding 46S.

An output delay circuit 42 is connected across the secondary winding 46S of the second output transformer 46. One of its output leads is connected to the other terminal of the secondary winding 44S of the first output transformer 44, the other output lead forming the other output terminal 48. The output delay circuit 42 has substantially the same delay characteristics as the input delay circuit 22.

For the particular transducer coding shown in FIG. 2, the other halves of the secondary windings, 24S and 26S, of the first and second input transformer are not needed. However, in other more complicated embodiments using Golay codings of greater length they will be required.

There is no necessary relationship for the distance between the last launch electrode 16L and the nearest receive electrode 36U. As far as the acoustic wave is connected, the distance does not matter; additional spacing merely means some additional delay. There is a practical problem however, in that there is capacitive coupling between the launch and receive transducers, 11 and 31, which is undesirable, so that generally it is desirable to leave a considerable spacing between the two adjacent electrodes, to reduce the capacitive coupling. Otherwise, electrical feed through may take place which may be large compared to the acoustically propagated signal.

The electrical response of the receive transducer 31 to an electrical delta function applied to the launch transducer 11 is, apart from a pure delay, the crosscorrelation function of the two weight sequences, convolved with $g(t)$, where $g(t) = -\delta(t-d) + 2\delta(t) - \delta(t+d)$, where $d = 2\Delta$ denotes twice the acoustic propagation delay time between adjacent transducer elements.

The second, auxiliary, external, delay line 42 may be realized in several different ways, since the required delay is relatively short, being only equal to the propagation time between adjacent transducer elements on the main delay line. One implementation is to use a short section of electrical transmission line.

An alternative implementation, which might be preferred when the unidirectional transducer device 10 is used to construct a serial-access clocked digital memory, would be to drive the bus line 11 for the first set of elementary transducers 16U from one stage of a shift register, and to drive the bus line for the second set of elementary transducers 16L from a later stage of the same shift register.

To reconstitute a pulse, if the same output structure be retained with a short delay line 42 in the output, the final output at terminals 48 may be connected to a pulse-shaping gate, which is connected to a two-stage shift register. The output from the first stage of the shift register goes to one of the input transformers, say 24P, while the output from the second stage of the shift register goes to the other input transformer 26P. Essentially, the delay on the input side of the transformer caused by input delay circuit 22 is replaced by the delay produced by the shift register.

In the prior art embodiment shown in FIG. 1, while there is an acoustic propagation delay involved, compared to the delays involved in this invention, the delays are comparatively long, because the relative delay must be equal to the propagation time over the many, extended, sections of transducers of the prior art invention. The fact that the relative propagation factor must be long, means that the device shown in FIG. 1 is intrinsically narrowband.

This long delay time is circumvented in this invention, the delay times being relatively small, making the devices of this invention broadband.

There is a relationship between the positioning of the two delay lines, 22 and 42, and the coding of the electrodes on the substrate 12. This may be seen from analyzing FIGS. 3A and 3B. Assume a delta signal $\delta(t)$ introduced at the input port 52, into the righthand transducer, not specifically shown, but to be assumed present on the substrate 12 under the right-hand arrow 54. It will generate an acoustic pulse propagating both to the left and to the right, as indicated by the two horizontal arrows, 55L and 55R.

In the context of this invention, a launch tap may be considered to be any linear means of converting an electrical signal into an acoustic signal on the substrate 12. At the left-hand tap 56, deisgnated −1, under which another transducer may be assumed to be located, Δ seconds after the initial pulse was launched at the input 52, assume that there is another pulse propagating along the surface of the substrate 12 toward the left, which will reach tap 56. At the same time, the first electrical input pulse, which in the meantime has undergone an electrical time delay of Δ, will also be at the left-hand transducer under tap 56. The two events will be simultaneous. The −1 at the left-hand tap 56 indicates that the transducer element under it has a negative weighting, that is, has a negative coding as compared to the coding of the positive transducer under the right-hand arrow 54.

Therefore, the two pulses coincident at the left-hand tap 56 have equal amplitude and opposite sign, and therefore cancel each other. Moreover, the same cancellation would take place at all transducer elements to the left of the left-hand tap 56. Two pulses of opposite sign but equal magnitude will alway arrive simultaneously at any particular transducer element.

Discussing now what happens at the right-hand transducer elements, under arrow 54, again two pulses arrive equal in magnitude and of opposite sign, but they will not arrive at identically the same time. One pulse will have a time delay of 2Δ greater than the other pulse.

In brief, the two delays are added at all points to the right of one tap, tap 54, but at all points to the left of the other tap, tap 56, they are subtracted. The mere addition and subtraction of pulses in this manner has been done in the prior art.

Similar comments apply to the elementary receive transducer 60 shown in FIG. 3B.

The teachings disclosed in FIGS. 3A and 3B have wide applicability and are not restricted to surface-wave devices. These figures are conceptual diagrams and could apply, for example, to magnetostrictive delay lines, comprising winding about a magnetized wire.

Referring now to FIG. 4A, there is shown a transversal filter configuration which illustrates the basic principle of a coded unidirectional launch transducer device 70. A desired weight sequence for the taps $h_1, h_2, \ldots h_N$ is chosen for the launch transducer 72. 2N elementary transducers, or transducer elements, are placed along a delay line 74 with weightings $h_1, -h_1, h_2, -h_2, \ldots h_N, -h_N$. The elementary transducers in odd-numbered positions, i.e., with weights $h_1, h_2, \ldots h_N$, are driven through a second delay line 76 with delay equal to the acoustic propagation time between taps. Those in even-numbered positions, i.e., those with weights $-h_1, -h_2, \ldots -h_N$, are driven directly.

In one direction the two delays are equal, and no acoustic signal appears outside the transducer 72. In the opposite direction, the acoustic response to an electrical impulse is a copy of the weight function h, convolved with a pair of delta functions having opposite signs. The delta functions are separated by twice the acoustic propagation time between adjacent taps.

In FIG. 4A either set of electrodes, those under the $h_i$ taps or those under the $-h_i$ taps, could be driven directly, but, in either case, one would negate that set of taps which are delayed. But then the direction of acoustic wave propagation would be changed. Whether the leftmost or the rightmost taps are delayed will determine in which direction the acoustic wave propagates.

In FIG. 4A the tap spacings are all shown as being equally spaced. Specifically, the $-h_1$ tap lies exactly halfway between the $h_1$ and $h_2$ taps. This halfway spacing is not really necessary. All that is necessary for all $k$, one uses the same spacing between the $h_k$ tap and the $-h_k$ tap. There can be a relatively wide spacing between $h_1$ and $h_2$, between $h_2$ and $h_3$, etc., and then a shorter spacing might occur between the $h_1$ and the $-h_i$. This type of delay could be very useful for some applications. So that the important point is that the auxiliary delay must equal the spacing between the $h_k$ tap and the $-h_k$ tap. The spacing between the $h_1$ and $-h_1$ need not equal the spacing $-h_1$ and $h_2$. That spacing can be different.

In summary, there are two basic tap spacings involved in FIG. 4A. One would want the same spacing to occur in the upper set of taps and the lower set of taps. Of course, these may not be the actual physical positions of the taps. But, there may be an entirely different spacing for the relative offset between the two sets of taps. In particular, one is more likely to make the relative off-set spacing small. In general, it is desirable to keep the delay between the upper and lower sets of transducers as short as possible.

FIG. 4B shows a unidirectional launch transducer drive 80 of another type, including a surface-wave transducer 81 comprising a substrate 82 capable of propagating an acoustic surface wave, the direction of wave propagation defining an axis 83.

A pair of inner bus bars, 84U and 84L, are disposed upon the substrate 82 in a direction parallel to the axis 83 of wave propagation. A pair of sets of electrodes, 86U and 86L, one set connected to each of the inner bus bars, 84U and 84L, respectively, are disposed upon the substrate 82 in a direction perpendicular to the axis 83.

A pair of outer bus bars, 88U and 88L, are disposed upon the substrate 82 in a direction parallel to the axis 83 of propagation, and insulated from the two inner bus bars 84U and 84L. A second pair of sets of electrodes, 92U and 92L, are disposed upon the substrate 82 in a direction parallel to and insulated from the first-named pair of sets of electrodes, 86U and 86L, one set connected to each of the outer bus bars, 88U and 88L.

The surface-wave transducer 80 may further comprise a field-delineating electrode structure 94, interleaved between the other, active, electrodes so as to electrically shield any two adjacent electrodes from each other.

In some applications, the electrodes may be uncoded, but in the embodiments of this invention the electrodes are generally coded. Moreover, as shown in FIG. 4B, all of the electrodes need not have the same weighting, as indicated by the different lengths of the various electrodes.

Furthermore, it should be noted that the two upper bus bars, 84U and 88U, and the respective electrodes, 86U and 86L, connected to each must be spaced or otherwise insulated one from the other. This somewhat complicates the fabrication of the structure 81. For example, if the inner bus bars, 84U and 84L, and their connected electrodes, 86U and 86L, are first deposited on the substrate 82, an insulating overlay must then be deposited over at least part of the bus bars to permit an independent electrical connection of the electrodes connected to the outer set of bus bars, 88U and 88L.

In addition to the surface-wave transducer 81, the unidirectional launch transducer device 80 may further comprise a first input center-tapped transformer 96, which includes a secondary winding, 96S whose live terminals are connected across the inner bus bars, 84U and 84L, and whose center tap is connected to the field-delineating electrode structure 94; and a primary winding 96P.

A second input center-tapped transformer 98 includes a secondary winding, 98S whose live terminals are connected across the outer bus bars, 88U and 88L, and whose center tap is connected to the field-delineating electrode structure 94; and a primary winding 98P, connectable to a signal generating source, not shown.

An input delay circuit 99 has its output connected to the primary winding 96P of the first input transformer 96, and its input connected to the primary winding 98P of the second input transformer 98.

The type of construction shown in FIG. 4B, wherein there are two upper electrodes, 84U and 88U, and two lower electrodes, 84L and 88L, each pair insulated from the other, allows several independent acoustic signals to be introduced in overlapping regions of space on the same portions of the substrate 82 at the same time. Its primary function herein is to achieve unidirectionality of acoustic signal propagation.

Referring now to FIG. 5A, a second weight sequence $w_1, \ldots w_L$ is chosen for the receiving transducer, not necessarily the same as the weight sequence $h_i$ of FIG. 4A. 2L elementary receiving transducers, one electrode each, with weights $w_1, -w_1, \ldots, w_L, -w_L$ are placed on the same line as the launch array of the launch transducer 72 shown in FIG. 4A. The outputs of the elementary transducers in odd-numbered positions are summed, as are those in even-numbered positions. The two partial sums are added, with one delayed by an amount equal to the acoustic propagation delay between adjacent elementary transducers.

The electrical response of the receive transducer to an acoustic impulse from the desired direction is the convolution of the weight sequence with a pair of delta functions having opposite signs and spaced by twice the acoustic propagation delay, $2\Delta$, between adjacent elementary transducers.

Although in all the embodiments disclosed herein, the number of launch transducer elements 2N equals the number of receive transducer elements 2L, that is, N equals L, this is not essential for the successful operation of the invention. It is necessary for the Golay-coded cases, however.

FIG. 5A shows a tapping for the receive transducer 102, $w_i$, which indicates that the tappings are different from the tappings $h_k$ in the launch transducer 72 shown in FIG. 4A. The spacing shown in FIGS. 4A and 5A are independent of each other. In each case, it is an arbitrary code that is being represented, for $h_1$, $h_2$, etc. They need not be the same code.

In general there need not be any correlation between the tap spacings of the launch transducer 72 and that of the receive transducer 102. In the particular case of the Golay-coded launch and receive transducers, to be described hereinbelow, the coding would be the same. But, for a specific application one might be building a general filter, and in such an instance there need not be any correlation between the launch and receive transducers.

Some of the implementations of the transducer devices of this invention are bilateral, that is, the input signal may be applied to the output port and the output signal may be obtained at what was originally the input port. Whether or not a device is bilateral depends upon how the summation is implemented. If the summation were implemented by a device like a summing amplifier, then the transducer device would probably not be bilateral, because the amplifier itself is not bilateral, for most amplifiers. However, if the summation were performed by something like a transformer, with three windings, an output winding and two input windings, then in fact the transducer device will be bilateral.

The embodiments shown in FIG. 4A and FIG. 5A may indeed be made bilateral, providing that the summation is accomplished with a bilateral device, such as a three-winding transformer. The embodiment shown in FIG. 2 is bilateral.

Referring now to FIG. 5A, this figure shows an implementation of a coded unidirectional receive transducer in generalized form to be used with the generalized implementation of the coded unidirectional launch transducer device 70 of FIG. 4A. In a specific implementation, the device may comprise a unidirectional acoustoelectric receive transducer device 100, comprising a receive transducer 102, which in turn may include an acoustic delay line in the form of a substrate 104, and two sets of taps, 103U and 103L, in the form of two sets of parallel, weighted, transducer elements disposed upon the substrate, the total number of elements being equal to 2L where L > 2. One set of taps 103U, or transducer elements, has a weighting of $w_1, w_2, \ldots, w_N$, the other set of taps 103L, or transducer elements, having a weighting of $-w_1, -w_2, \ldots, -w_N$. As shown, the two sets of transducer elements are disposed on the substrate 12 in the sequence $w_1, -w_1, w_2, -w_2, \ldots, w_N, -w_N$.

In general terms, a first and second means are applied to the transducer elements, 103U and 103L, for detecting the presence of an electrical signal at the transducer elements, the first means being applied directly to those transducer elements having the weighting $w_1, w_2, \ldots w_N$.

Included in the transducer device 100 is a delay 106 circuit having two ports, one port being connected to the second detecting means, the delay between the input and the output ports being equal to the acoustic propagation time between two adjacent transducer elements.

A summation circuit 108 has one of its two inputs connected to the output port of the delay circuit 106, the other input being connected to the first detecting means. The summation circuit 108 sums the outputs, first, of those transducer elements 103U having a positive weighting, second, of those elements 103L having a negative weighting, the two partial sums then being added, with the partial sum derived from the negative weightings delayed by an amount equal to the acoustic propagation delay between adjacent elementary transducers.

Referring now to FIG. 5B, this figure shows a unidirectional receive transducer device 110, which includes a receive transducer 111, which may actually be disposed upon the same substrate 82 as the launch transducer 81 shown in FIG. 4B.

However, the receive transducer 111 need not be disposed upon the same substrate as the launch transducer 81. It might be desired to use a bidirectional launch transducer and a unidirectional receive transducer, or vice versa. There is not absolute necessity for using a unidirectional launch transducer only with a unidirectional receive transducer.

There are applications in which a unidirectional launch transducer only would be desired. For example, if one wanted to apply this invention to the propagation of acoustic surface waves across the surface of a frustrated total internal reflection correlator, there is no receiving at all of acoustic surface waves, surface waves only being launched.

The surface-wave receive transducer 111 in FIG. 5B is substantially identical to the surface-wave launch transducer 81, shown in FIG. 4B, and comprises a second pair of inner bus bars, 114U and 114L, disposed upon the substrate 82 parallel to the other bus bars, for example, bus bars 84U and 84L. A third pair of sets of electrodes, 116U and 116L, one set connected to each of the second pair of inner bus bars, 114U and 114L, respectively, are disposed upon the substrate 82, also parallel to the other electrodes.

A second pair of outer bus bars, 118U and 118L, are disposed upon the substrate 82 parallel to the other bus bars, for example, bus bars 114U and 114L. A fourth pair of sets of electrodes, 122U and 122L, one set connected to each of the second pair of outer bus bars, 118U and 118L, are disposed upon the substrate 82 parallel to the other electrodes.

A second field-delineating electrode structure 124 interleaves the electrodes of the third and fourth pair of sets of electrodes, 118U and 118L, and 122U and 122L, so as to electrically shield any two adjacent electrodes from each other.

The combination of the launch transducer 81 with receive transducer 111 comprises a launch and receive transducer device, all on one substrate 82.

The unidirectional receive transducer device 110 shown in FIG. 5B further comprises a first output, center-tapped, transformer 126 which includes a secondary winding 126S whose live terminals are connected across the second pair of inner bus bars, 114U and 114L, and whose center tap is connected to the second field-delineating electrode structure 124; and a primary winding 126P, one of whose terminals is an output terminal.

A second output, center-tapped, transformer 128 includes a secondary winding 128S whose live terminals are connected across the second pair of outer bus bars, 118U and 118L, and whose center tap is connected to the second field-delineating electrode structure 124; and a primary winding 128P.

An output delay circuit 129 has its output connected to the primary winding 128P of the second output transformer 128, one of its output leads being connected to the other terminal of the primary winding 126P of the first output transformer 126, the other output lead forming the other output terminal.

The combination of transducer devices 80 and 110, shown in FIGS. 4B and 5B, comprise a unidirectional launch and receive transducer device.

Referring now to FIG. 6, this figure shows a still more complicated unidirectional transducer device 130, which comprises a first launch transducer 140, which in turn comprises a substrate 132, capable of propagating an acoustic surface wave, the direction of wave propagation defining an axis 133.

A pair of bus bars, 144U and 144L, are disposed upon the substrate 132 in a direction parallel to the axis 133 of wave propagation. Included are a pair of sets of electrodes, one set 146U connected to one of the bus bars 144U, the other set 146L being connected to the other, lower, bus bar 146L, the electrodes being disposed upon the substrate in a direction perpendicular to the axis 133. The pair of sets of electrodes 146U and 146L, are coded according to one member of a Golay complementary pair, the specific coding being 1, 1, as shown. A field-delineating electrode structure 148 interleaves the electrodes of the pair of sets of electrodes, 146U and 146L, so as to electrically shield any two adjacent electrodes from each other.

A first input means 152 is connected across one of the bus bars 144U and the field-delineating electrode structure 148, and is connectable to a signal-generating source, not shown, for impressing an electrical signal across the bus bar and the electrode structure. A second input means 154 is connected to the field-delineating electrode structure 148.

A first input delay circuit 156 is connected between the second input means 154, and the other bus bar, for delaying the phase of the electrical signal which may be impressed by the second input means with respect to the signal impressed by the first input means.

A first receive transducer 160 is substantially identical to the first launch transducer 140, the two transducers being disposed in an aligned manner upon the same substrate 132, with the bus bars, 164U and 164L, and all of the electrodes, 166U and 166L, of each of the two transducers being respectively parallel to each other.

A first output means 172 is connected across one of the bus bars 164U and the field-delineating electrode structure 168 of the receive transducer 160. A second output means 174 is connected to the electrode structure 168 of the receive transducer 160.

A first output delay circuit 176 is connected between the other bus bar 164L and the second output means 174, and has substantially the same delay characteristics as the input delay circuit 156.

A second launch transducer 180 disposed upon the same substrate 132, comprises a pair of inner bus bars, 182U and 182L, disposed upon the substrate in a direction parallel to the axis 133 of wave propagation. A pair of sets of electrodes, 184U and 184L, one set connected to each of the inner bus bars, 182U and 182L, are disposed upon the substrate 132 in a direction perpendicular to the axis 132. A pair of outer bus bars, 186U and 186L, are disposed upon the substrate 132 in a direction parallel to the axis of propagation 133, and insulated from the two inner bus bars, 182U and 182L. A second pair of sets of electrodes, 188U and 188L, are disposed upon the substrate 132 in a direction parallel to and insulated from the first-named pair of sets of electrodes, 184U and 184L, one set connected to each of the outer bus bars, 186U and 186L. The two pairs of sets of electrodes, 184U, 184L and 188U, 188L, being coded according to the second member of the same Golay complementary pair, namely, 1, −1. A field-delineating electrode structure 189, interleaved between the other electrodes 184U, 184L and 188U, 188L, so as to electrically shield any two adjacent electrodes from each other, also forms a part of the second launch transducer 180.

A third input means 192 is connected across the inner bus bars 182U and 182L, and to the field-delineating electrode structure 189. A fourth input means 194 is connected across the outer bus bars, 186U and 186L.

A second input delay circuit 196 is connected to the fourth input means 194 and to the field-delineating electrode structure 189 of the second launch transducer 180.

A second receive transducer 200, substantially identical to the second launch transducer, 180 is disposed upon the same substrate 132 in an aligned manner.

A third output means 202 is connected across the second pair of inner bus bars, 202U and 202L, and to the second field-delineating electrode structure 209. A fourth output means 204 is connected across the second pair of outer bus bars, 206U and 206L.

A second output delay circuit 206 is connected to the fourth output means 204 and to the second field-delineating structure 209. It has substantially the same delay as the other delay circuits of the Golay-coded unidirectional surface delay line 130.

Still referring to FIG. 6, it will be noted that the two upper transducers, 140 and 160, are coded according to one member of a Golay complementary pair namely, 1, 1, and the two lower transducers 180 and 200, are coded according to the other member of the same Golay complementary pair, namely, 1−1. It will also be noted that the upper transducers, 140 and 160, represent a degenerate case where only two bus bars, 144U, 144L and 164U, 164L, are needed for each transducer.

For a longer Golay code, the upper transducer, 140 and 160, would have had to include a total of four bus bars, as in the lower transducers 180 and 200.

As stated immediately hereinabove, the top set of electrodes of the first launch and receive transducers 140 and 160 need not be field-delineated, but if they are not field-delineated, then, for many codes, one would want to use adequate spacing between the taps in each transducer. It is desired to have adjacent finger pairs narrowly spaced, but with wide separation between sets of finger pairs, for example between those of transducers 140 and 160.

Even though the coding of the top of the electrodes is uniform, that is, the electrodes are uncoded in actuality, the field-delineating electrodes 148 and 168 may be required because of the relative delay on the second, lower, set of electrodes, of transducers 180 and 200. The field-delineating electrode represents a meandering ground line, which is always automatically at zero potential, so that physically there is no need for the line, but the relative delay means that the space occupied by the ground line would not necessarily be at zero potential if the ground line were not there. The "ground" is merely a reference potential to which other potentials are referred to.

Referring now to FIG. 7, this figure shows a delay line configuration 210 wherein two acoustic propagation paths, 211U and 211L, are utilized, launching and receiving on each with a unidirectional transducer of the type shown in FIGS. 4A and 5A. A Golay complementary sequence pair A, B is selected and A is used for the weights of the launch and receive transducers, 220 and 230, on the first path 211U and B is the weighting used for the launch and receive transducers, 240 and 250, for the second path 211L. The two unidirectional launch transducers, 220 and 240, are driven together, and the outputs of the two unidirectional receive transducers, 230 and 250, are summed. The impulse response of the delay line 210 is the convolution of the autocorrelation function of the impulse response of an elementary bidirectional transducer with the function g, previously described.

More than two acoustic propagation paths may be utilized. By inserting additional launch and receive transducers, the number of signal paths may be made equal to the number of acoustic propagation paths.

In another type of embodiment, not shown, desired impulse response h is chosen, together with a Golay complementary sequence pair A, B. Two acoustic propagation paths are utilized. The launch transducers are unidirectional transducers as described in relation to FIG. 7, with weights corresponding to A and B respectively. The receive transducers are unidirectional transducers, also as described in relation with FIG. 7, with weights corresponding to $h * A$ and $h * B$ respectively, where the asterisk * denotes crosscorrelation. The two unidirectional launch transducers are driven electrically in parallel, and the outputs of the two unidirectional receive transducers are added.

Obviously many modifications and variations of the present invention are possible in the light of the above teachings. It is therefore to be understood that within the scope of the appended claims the invention may be practiced otherwise than as specifically described.

What is claimed is:

1. A unidirectional transducer device comprising:
    a launch transducer which comprises:
        a substrate, capable of propagating an acoustic surface wave, the direction of wave propagation defining an axis;
        a pair of bus bars, disposed upon the substrate in a direction parallel to the axis of wave propagation;
        a pair of sets of electrodes, one set connected to one of the bus bars, the other set being connected to the other bus bar, the electrodes being disposed upon the substrate in a direction perpendicular to the axis; and
        a field-delineating electrode structure which interleaves the electrodes of the pair of sets of electrodes so as to electrically shield any two adjacent electrodes from each other;
    means connected across one of the bus bars and the field-delineating electrode structure, and connectable to a signal-generating source, for impressing an electrical signal across the bus bar and the electrode structure;
    a second means connected across the other bus bar and the field-delineating electrode structure, and connectable to a signal generating source, for impressing an electrical signal across the other bus bar and the electrode structure in phase with the first-named electrical signal; and
    an input delay circuit connected to the second means, for delaying the phase of the electrical signal impressed by the second means, with respect to the signal impressed by the first means.

2. The unidirectional transducer device according to claim 1, wherein:
    the spacing between adjacent electrodes of one of the pair of sets of electrodes is the same as the spacing between corresponding adjacent electrodes of the other one of the pair of sets of electrodes; and wherein
    one of the end electrodes is disposed halfway between the end and adjacent electrodes of the other set of electrodes.

3. The unidirectional transducer device according to claim 2, wherein
    the first means comprises a first input transformer which includes:
        a secondary winding which is connected across one of the bus bars and the field-delineating electrode structure; and
        a primary winding;
    the second means comprises a second input transformer which includes:
        a secondary winding which is connected across the other bus bar and the field-delineating electrode structure; and
        a primary winding connectable to the signal generating source; and
    the input delay circuit having its input connected to the primary winding of the second input transformer, its output being connected to the primary winding of the first input transformer;
    the unidirectional transducer device comprising a unidirectional launch transducer device.

4. The unidirectional launch transducer device according to claim 3, wherein
    the pair of sets of electrodes are coded.

5. The unidirectional launch transducer device according to claim 4, further comprising:
    a receive transducer substantially identical to the launch transducer, the two transducers being disposed upon the same substrate, with the bus bars and all of the electrodes of each of the two transducers being respectively parallel to each other;
    a first output transformer, which includes:
        a primary winding, connected across one of the bus bars and the electrode structure of the receive transducer;
        a secondary winding, one end of which forms an output terminal;
    a second output transformer, which includes:
        a primary winding connected across the other bus bar and the electrode structure of the receiver transducer;
        a secondary winding;
    an output delay circuit, connected across the secondary winding, one of whose output leads is connected to the other terminal of the secondary winding of the first output transformer, the other output lead forming the other output terminal, and having substantially the same delay characteristics as the input delay circuit.

6. A surface-wave transducer comprising:
    a substrate, capable of propagating an acoustic surface wave, the direction of wave propagation defining an axis;
    a pair of inner bus bars disposed upon the substrate in a direction parallel to the axis of wave propagation;
    a pair of sets of electrodes, one set connected to each of the inner bus bars, the electrodes being disposed upon the substrate in a direction perpendicular to the axis;
    a pair of outer bus bars, disposed upon the substrate in a direction parallel to the axis of propagation, and insulated from the two inner bus bars; and
    a second pair of sets of electrodes, disposed upon the substrate in a direction parallel to and insulated from the first-named pair of sets of electrodes, one set connected to each of the outer bus bars;
    adjacent electrodes being uniformly spaced irrespective of which pair of sets they belong to; and wherein at least one of the pairs of sets of electrodes is coded, the coding being accomplished in that the connection of one set of a pair of electrodes to its bus bar is not uniformly alternate with respect to the connection of the other set of electrodes of the same pair with its bus bar.

7. The surface-wave transducer according to claim 6, further comprising:
a field-delineating electrode structure, interleaved between the other electrodes so as to electrically shield any two adjacent electrodes from each other.

8. The surface-wave transducer according to claim 7, wherein the electrodes are coded by being various lengths.

9. The surface-wave transducer according to claim 8, further comprising:
a first input center-tapped transformer which includes:
a secondary winding, whose live terminals are connected across the inner bus bars, and whose center tap is connected to the field-delineating electrode;
a primary winding;
a second input center-tapped transformer which includes;
a secondary winding, whose live terminals are connected across the outer bus bars, and whose center tap is connected to the field-delineating electrode; and
a primary winding, connectable to a signal generating source; and
an input delay circuit whose output is connected to the primary winding of the first input transformer, and whose output is connected to the primary winding of the second input transformer;
the combination comprising a unidirectional launch transducer device.

10. The surface-wave transducer according to claim 7, further comprising:
a second pair of inner bus bars, disposed upon the substrate parallel to the other bus bars;
a third pair of sets of electrodes, one set connected to each of the second pair of inner bus bars, the electrodes being disposed upon the substrate parallel to the other electrodes;
a second pair of outer bus bars, disposed upon the substrate parallel to the other bus bars; and
a fourth pair of sets of electrodes, one set connected to each of the second pair of outer bus bars, the electrodes being disposed upon the substrate parallel to the other electrodes;
a second field-delineating electrode structure, which interleaves the electrodes of the third and fourth pair of sets of electrodes so as to electrically shield any two adjacent electrodes from each other;
the combination comprising a launch and receive transducer.

11. The unidirectional launch transducer according to claim 9, further comprising:
a receive transducer which comprises:
a second pair of inner bus bars, disposed upon the substrate parallel to the other bus bars;
a third pair of sets of electrodes, one set connected to each of the second pair of inner bus bars, the electrodes being disposed upon the substrate parallel to the other electrodes;
a second pair of outer bus bars, disposed upon the substrate parallel to the other bus bars;
a fourth pair of sets of electrodes, one set connected to each of the second pair of outer bus bars, the electrodes being disposed upon the substrate parallel to the other electrodes; and
a field-delineating electrode structure which interleaves the electrodes of the third and fourth pair of sets of electrodes so as to electrically shield any two adjacent electrodes from each other.

12. The unidirectional launch transducer according to claim 11, further comprising:
a first output, center-tapped, transformer which includes:
a secondary winding, whose live terminals are connected across the second pair of inner bus bars, and whose center tap is connected to the second field-delineating electrode; and structure; and
a primary winding, one of whose terminals is an output terminal;
a second, output center-tapped, transformer which includes:
a secondary winding, whose live terminals are connected across the second pair of outer bus bars, and whose center tap is connected to the second field-delineating electrode structure; and
a primary winding;
an output delay circuit, whose input is connected to the primary winding of the second output transformer, and one of whose output leads is connected to the other terminal of the primary winding of the first output transformer, the other output lead forming the other output terminal;
the combination comprising a unidirectional launch and receive transducer device.

13. A unidirectional electroacoustic launch transducer device comprising:
a substrate;
two sets of parallel, weighted, transducer elements disposed upon the substrate, the total number of elements being equal to 2N, where N > 2;
one set of transducer elements having a weighting $h_1, h_2, \ldots h_N$;
the other set of transducer elements having a weighting of $-h_1, -h_2, \ldots, h_N$;
the two sets of transducer elements being disposed on the substrate in the sequence $h_1, -h_1, h_2, -h_2, \ldots, h_N, -h_N$;
means for applying an input electrical signal to the transducer elements; the signal being applied directly to that set of transducer elements having the weighting $-h_1, -h_2, \ldots, -h_N$;
a delay circuit having two ports, the input port being connected to the signal applying means, the output port being connected to that set of transducer elements having the weighting $h_1, h_2, \ldots h_N$, the circuit having a delay between its input and output ports equal to the acoustic propagation time between two adjacent transducer elements.

14. A unidirectional acoustoelectric receive transducer device, for use with the electroacoustic transducer device according to claim 13, comprising:
a substrate;
two sets of parallel, weighted, transducer elements disposed upon the substrate, the total number of elements being equal to 2L, where L > 2;

one set of transducer elements having a weighting of $w_1, w_2, \ldots, w_N$; the other set of transducer elements having a weighting of $-w_1, -w_2, \ldots, -w_N$;

the two sets of transducer elements being disposed on the substrate in the sequence $w_1, -w_1, w_2, -w_2, \ldots, w_N, -w_N$;

a first and second means, applied to the transducer elements, for detecting the presence of an electrical signal at the transducer elements, the first means being applied directly to those transducer elements having the weighting $w_1, w_2, \ldots w_N$;

a delay circuit having two ports, one port being connected to the second detecting means, the delay between the input and output ports being equal to the acoustic propagation time between two adjacent transducer elements; and a summation circuit, one of whose two inputs is connected to the output port of the delay circuit, the other input being connected to the first detecting means;

the summation circuit summing the outputs, first, of those transducer elements having a positive weighting, second, of those elements having a negative weighting, the two partial sums then being added, with the partial sum derived from the negative weightings delayed by an amount equal to the acoustic propagation delay between adjacent elementary transducers.

15. A unidirectional transducer device comprising:
a first launch transducer which comprises:
  a substrate, capable of propagating an acoustic surface wave, the direction of wave propagation defining an axis;
  a pair of bus bars, disposed upon the substrate in a direction parallel to the axis of wave propagation;
  a pair of sets of electrodes, one set connected to one of the bus bars, the other set being connected to the other bus bar, the electrodes being disposed upon the substrate in a direction perpendicular to the axis;
  the pair of sets of electrodes being coded according to one member of a Golay complementary pair;
  a field-delineating electrode structure which interleaves the electrodes of the pair of sets of electrodes so as to electrically shield any two adjacent electrodes from each other;
a first input means connected across one of the bus bars and the field-delineating electrode structure, and connectable to a signal-generating source, for impressing an electrical signal across the bus bar and the electrode structure;
a second input means connected to the field-delineating electrode structure;
a first input delay circuit connected between the second input means and the other bus bar for delaying the phase of the electrical signal which may be impressed by the second input means with respect to the signal impressed by the first input means;

a first receive transducer substantially identical to the first launch transducer, the two transducers being disposed in an aligned manner upon the same substrate, with the bus bars and all of the electrodes of each of the two transducers being respectively parallel to each other;
a first output means, connected across one of the bus bars and the field-delineating electrode structure of the receive transducer;
a second output means connected to the electrode structure of the receive transducer;
a first output delay circuit, connected between the other bus bar and the second output means, having substantially the same delay characteristics as the input delay circuit;
a second launch transducer, disposed upon the same substrate, comprising:
  a pair of inner bus bars disposed upon the substrate in a direction parallel to the axis of wave propagation;
  a pair of sets of electrodes, one set connected to each of the inner bus bars, the electrodes being disposed upon the substrate in a direction perpendicular to the axis;
  a pair of outer bus bars, disposed upon the substrate in a direction parallel to the axis of propagation, and insulated from the two inner bus bars; and
  a second pair of sets of electrodes, disposed upon the substrate in a direction parallel to and insulated from the first-named pair of sets of electrodes, one set connected to each of the outer bus bars;
  the two pair of sets of electrodes coded according to the second member of the same Golay complementary pair;
  a field-delineating electrode structure, interleaved between the other electrodes so as to electrically shield any two adjacent electrodes from each other;
a third input means connected across the inner bus bars and to the field-delineating electrode structure;
a fourth input means connected across the outer bus bars; and
a second input delay circuit connected to the fourth input means and to the field-delineating electrode structure of the second launch transducer;
a second receive transducer substantially identical to the second launch transducer, and disposed upon the same substrate in an aligned manner;
a third output means connected across the second pair of inner bus bars and to the second field-delineating electrode structure;
a fourth output means, connected across the second pair of outer bus bars; and
a second output delay circuit connected to the third output means, having substantially the same delay as the other delay circuits.

* * * * *